United States Patent [19]

Kiesewetter et al.

[11] Patent Number: 5,442,054
[45] Date of Patent: Aug. 15, 1995

[54] HIGHLY SUBSTITUTED SULPHOALKYCELLULOSE DERIVATIVES, ESPECIALLY SULPHOETHYCELLULOSE ETHER, A PROCESS FOR THEIR PREPARATION AND THEIR USE AS THICKENING AGENT FOR TEXTILE PRINTING PASTES

[75] Inventors: René Kiesewetter, Soltau-Ahlften; Reinhard Kniewske, Fallingbostel; Eugen Reinhardt; Klaus Szablikowski, both of Walsrode, Germany

[73] Assignee: Wolff Walsrode Aktiengesellschaft, Walsrode, Germany

[21] Appl. No.: 166,402

[22] Filed: Dec. 14, 1993

[30] Foreign Application Priority Data

Dec. 21, 1992 [DE] Germany ............... 42 43 281.2

[51] Int. Cl.$^6$ ............... C08B 11/10; C09D 11/08
[52] U.S. Cl. ............... 536/84; 536/90; 536/92; 536/97; 536/98; 8/445; 8/528
[58] Field of Search ............... 536/84, 92, 90, 97, 536/98; 8/528, 445, 559, 562

[56] References Cited

U.S. PATENT DOCUMENTS

| | | | |
|---|---|---|---|
| 4,413,121 | 11/1983 | Brandt et al. | 536/90 |
| 4,426,206 | 1/1984 | Hosokawa et al. | 8/528 |
| 4,460,766 | 7/1984 | Felcht et al. | 536/84 |
| 4,519,923 | 5/1985 | Hori et al. | 252/8.5 |
| 4,990,609 | 2/1991 | Herzog et al. | 536/92 |
| 5,177,199 | 1/1993 | Kiesewetter et al. | 536/90 |
| 5,278,304 | 1/1994 | Kniewske et al. | 536/92 |

FOREIGN PATENT DOCUMENTS

0319867 6/1989 European Pat. Off. .
693030 6/1940 Germany .

*Primary Examiner*—Nathan M. Nutter
*Attorney, Agent, or Firm*—Sprung Horn Kramer & Woods

[57] ABSTRACT

The present invention relates to sulphoalkylcellulose derivatives, in particular sulphoethylcellulose, with a degree of substitution by sulphoethyl groups of 1.2 to 2.0 using a one- to three-step, preferably two-step process and the use of the sulphoalkyl-cellulose derivatives as thickening agents or rheology improvers in textile printing.

7 Claims, No Drawings

HIGHLY SUBSTITUTED SULPHOALKYCELLULOSE DERIVATIVES, ESPECIALLY SULPHOETHYCELLULOSE ETHER, A PROCESS FOR THEIR PREPARATION AND THEIR USE AS THICKENING AGENT FOR TEXTILE PRINTING PASTES

The present invention relates to sulphoalkylcellulose derivatives with a degree of substitution by sulphoalkyl groups of between 1.2 and 2.0 and their use as thickening agents in textile printing.

A printing ink (printing paste) is understood to mean a finished combination, which is suitable for printing, of a dye with other components which are required for printing. The most important of these components is the thickening agent which is intended to provide the printing ink with a viscosity which is appropriate for printing, since low viscosity, aqueous dye solutions tend to run and the contours of the pattern cannot then be kept sharp. Furthermore, the thickening agent undertakes functions in the printing paste which protect the colloid and the film, control the moisture balance of the printing paste and thus have a lasting effect on the dyestuff yield (B. Habereder, F. Baierlein in: Handbuch der Textilhilfsmittel; Editors: A. Chwala, V. Anger, Verlag Chemie, Weinheim 1977, p.621).

Thickeners must be compatible with the corresponding dyestuffs and should not react with them. Reactive dyestuffs possess, for instance, the types of reactive groups which react with the substrate in the presence of alkalis under the dyeing conditions and fix the dye via a covalent bond (H. Zollinger, Angew. Chem., 73, 125 [1961]). Thickening agents, which have a similar structure to that of the substrate being dyed are, therefore, generally unsuitable.

In order to avoid imperfect printing, which could be due to blockage of the stencils or gauzes, thickeners must not contain any fibres or gels.

Alginates and sodium carboxymethylcelluloses represent by far the largest proportion of the numerous thickening agents used in textile printing. The alkali salts of alginic acid, which are generally used in concentrations of 3 to 4%, have the advantage that they wash out well. Alginates are compatible with a number of dyestuffs and largely stable in the pH range from 5 to 10. At higher pH, transeliminative depolymerisations are observed (A. Hang et al., Acta Chem. Scand., 21 2859 [1967]). Since alkali metal alginates are known to be incompatible with heavy metal salts and calcium and ammonium compounds, the use of sequestering agents is therefore necessary. An alginate, as a biopolymer, is readily degraded by microorganisms. Unprotected thickeners generally keep for only up to two days, so that preservatives such as e.g. formaldehyde solutions or phenols have to be added to the thickeners.

Very high thermal stability is required when using thickeners for textile printing in warmer regions. Quantitative decarboxylation can occur when using alginates.

The sodium carboxymethylcelluloses currently used as thickening agents and rheology improvers in reactive printing have degrees of substitution of 2 or higher. Carboxymethylcellulose (CMC) with a DS<2 cannot be used, since it causes the textile fabric to feel harder after printing, due to reactions of the CMC with the dye via non-etherified OH groups.

The ability of a CMC with a degree of substitution of <2 to react with the reactive dye depends on the structure of the CMC and the site of substitution of the carboxymethyl groups in an anhydroglucose unit. In comparison with carboxymethylcellulose, an alginate whose $C_6$ position represents a carboxyl function and thus a "degree of substitution" with respect to carboxyl functions of 1, does not generally react with reactive dyes.

According to the prior art, therefore, the disadvantage of a harder feel following reactive dyeing, due to using CMC as a thickening agent, is only overcome at degrees of substitution of more than ca. 2.2 (compare DE-PS 3 208 430).

The preparation of a CMC with $DS \geq 2.2$, is however extremely cost intensive and leads, with increasing degrees of substitution, to much poorer reagent yields (see e.g. M. U. Mahmud, Acta Polym., 38 (1987) (3), 172; R. R. McLaughlin, J. H. E. Herbst, Can. J Res, 28 B (1950) 731; K. Engelskirchen in Houben Weyl's "Makromoleculare Stoffe", vol. E 20/III, Georg Thieme Verlag, Stuttgart, 1987, p. 2072 et seq.).

Other important thickening agents used in textile printing include xanthanes, emulsion thickeners and synthetic polymeric thickening agents. However, these all have a number of disadvantages, so that the desired effect cannot be achieved with an individual thickening agent on its own. Printing with emulsion thickeners, for example, is rapidly declining, for price and ecological reasons. Xanthanes, apart from their high cost, have insufficient stability towards microbial degradation. Polymeric thickeners are extremely electrolyte-sensitive, which makes them particularly sensitive towards hard water, anionic dyes and anti-flow salts.

The technical object of the invention is to provide a cellulose derivative which does not react with reactive dyes at degrees of substitution which are a great deal lower than 2.2, and thus does not produce hardness in the substrate (textile fabric). The product should be stable towards microbial degradation and should exhibit no sensitivity towards electrolytes, particularly critical divalent cations (such as e.g. $Ca^{2+}$). The properties during printing should be comparable with those of alginates.

Surprisingly, it has been found that sulphoalkylcellulose derivatives, especially sulphoethylcellulose derivatives with degrees of substitution between 1.2 and 2.0, in particular between 1.4 and 1.8, overcome the disadvantages of the prior art when the sulphoethylcellulose derivative is prepared as follows:

1. Preparation of a sulphoethylcellulose (SEC) by a slurry process to give a degree of substitution of ca. 0.5 to ca. 1.0.
2. Further etherification of the sulphoethylcellulose, after optionally purifying, drying and milling, in a further process step (e.g. a semi-dry or slurry process) to give a sulphoethylcellulose with a degree of substitution of 1.2 to 2.0, in particular of 1.4 to 1.8, wherein the alkali not consumed in the reaction is then washed out with aqueous/organic solvents, or is reacted with alkali-consuming reagents such as for example alkyl halides, e.g. methyl chloride, but is preferably neutralised with an acid.
3. Drying and milling of the sulphoethylcellulose obtained in this way after complete or partial separation of the salts or reaction by-products, wherein a purification operation is preferably not performed after etherification. Finally, make-up in the conventional and known manner.

In order to be able to ensure high viscosity, it may be expedient partially or completely to wash out the amounts of salts and reaction by-products remaining after the first step by treating with aqueous/organic solvents.

In order to increase the availability of the cellulose or the sulphoethylcellulose obtained after the first step and thus to improve the reagent yield, reaction may be performed, preferably before reaction with the sulphoalkyl-containing reagents, with small amounts of activating agents such as e.g. methyl chloride, chloroacetic acid and/or epoxides, especially ethylene oxide and/or propylene oxide, without thereby impairing the character of the cellulose ether, in particular its exceptional application qualities (stability towards salts and pH; printing properties). It may also be advantageous to neutralize the quantities of alkali present after sulfoethylation with alkali-consuming reagents such as for example alkyl halides. The degree of substitution with respect to alkali-consuming reagents (e.g. methyl chloride) is DS<0.5. If reagents are used which react with even catalytic amounts of alkali the degree of molecular substitution (MS) is at most 0.7.

It was found that sulphoethylcellulose prepared as described under points 1 to 3 did not lead to detectable hardening in the feel of the substrate in textile printing with reactive dyes. Such a product can be used as an alternative to alginate thickening agents. The advantages of SEC prepared in this way are: minimum expenditure on reagents, a high active content due to subsequent treatment, optionally after the first step, and thus the production of a higher viscosity. The SEC is stable towards microbial degradation, has outstanding resistance to electrolytes and can be used either purified or partially purified, but especially as a technical-grade product.

An important criterion of quality of the sulphoalkylcellulose derivative prepared by the method according to the invention, especially sulphoethyl-cellulose derivatives, is the complete water-solubility of the product which is obtained, this being >99.9%, and the high transmission value of its aqueous solutions, which is >96%.

U.S. Pat. No. 2,132,181 describes a process for preparing sulphoethylcellulose in a mixer, but these have high proportions of fibres and gels as a consequence of the process which is used.

U.S. Pat. No. 2,580,352 describes the preparation of cellulose-sulphoethyl ethers by reacting an alkaline polysaccharide suspension in an inert organic solvent. The data mentioned in the examples on the preparation of sulphoethylcellulose, however, shows that degrees of substitution of only a maximum of ca. 1.0 can be produced by this method.

T. Timell (Svensk Papperstidning 51, no. 11, 254 [1948]) describes the preparation of sulphoethylcelluloses with degrees of substitution by sulphoethyl groups of a maximum of 0.42. As already described above, products with this type of low degree of substitution are not suitable as thickening agents in reactive printing, because reactions with the reactive dye may take place via the non-etherified hydroxyl groups in the cellulose. Poorer printing qualities and hardening of the feel of the textile fabric are the result of such low degrees of substitution.

In the case of the water-soluble cellulose ethers described in DE-OS 3 147 434, DE-OS 3 306 621, DE-OS 3 316 124 and DE-OS 3 417 952, among others, the reaction with reagents which carry sulphoalkyl groups is described. The products, which are not described in greater detail with regard to their viscosity, their degree of substitution, their yield or their solution quality, are prepared either on their own in dimethyl ether or dimethoxyethane or mixed with alkanols, alkanediols and/or alkoxyalkanols.

E. A. Plisko et al. (Zh. Prikl. Khim. 36, 1994 [1963]and Zh. Prikl. Khim. 50, 9, 2003 [1967]) describe the preparation of SEC by reaction of alkali cellulose with the sodium salt of 2-chloroethanesulphonic acid. The reactions, carried out in a slurry process, however, lead to only extremely low viscosity or poorly-substituted products (maximum degree of substitution 0.42).

SU-757 540 describes a two-step process for the preparation of an SEC in which alkali cellulose is prepared in the first step by reacting cellulose with aqueous caustic soda solution; the alkali cellulose is compressed using a compression mould and subsequently broken up. In a second step, the compressed alkali cellulose is then sulphoethylated with sodium vinylsulphonate in a slurry process, with yields of ca. 9 to 43%. Apart from the separately performed alkalisation and the low degree of substitution mentioned by way of example (DS-sulphoethyl=0.55), the unavoidable alkaline-oxidative degradation of the cellulose due to the process, which leads to only low viscosity etherification products, is a prime disadvantage.

JP-8 218 701 describes the preparation of SEC by reacting alkali cellulose with the sodium salt of 2-chloroethanesulphonic acid by stepwise addition to an inert slurry medium. The products, however, cannot be used in reactive printing due to the low degree of substitution (DS ca. 0.3).

Using the process according to the present invention, a sulphoalkylcellulose derivative, in particular a sulphoethylcellulose, is claimed which has improved printing properties in textile printing as compared with the conventionally used sodium carboxymethylcelluloses (see e.g. DE-PS 3 208 430), at much lower degrees of substitution as compared with the prior art.

The process claimed according to the invention for preparing an SEC and the use of just such a product as a thickening agent in textile printing, especially reactive printing, is described in more detail in the examples given below.

The viscosities quoted in the examples are determined using a rotation viscometer (Haake) RV 100, system M500, measuring device MV according to DIN 53 019, at a shear speed of D=2.5 s$^{-1}$ (T=20° C.).

The cellulose ethers claimed according to the invention have viscosities of 10 to 50,000 mPa.s (rotation viscometer, measured as a 2% by weight strength aqueous solution of the purified substance with a shear gradient of D=2.5 s$^{-1}$ at 20° C.).

The degree of carboxymethylcellulose substitution is determined according to ASTM-D 1439-83a (method B). The degree of substitution by sulphoethyl is determined by titration with barium perchlorate against thorin according to Ehrenberger/Gorbach (Methoden der Organischen Elementarund Spurenanalyse, Verlag Chemie, Weinheim, 1973, p. 223). Schöninger's method was used for the digestion procedure (Heraeus-Druckschrift EW-F 1.6.1 [method 1]).

The transmissions of the sulphoethyl or carboxymethylcelluloses quoted in the examples are all less than 96% (Hitachi-Spectral photometer Model 101, Hitachi Ltd., Tokyo, Japan). The measurements are performed using 2% by wt. strength aqueous solutions in a glass cell with a 10 mm optical path-length (λ=550 nm). The water-soluble fraction of the products mentioned by way of example and claimed according to the invention is ≧99.9%.

The sulphoethylcelluloses prepared according to the invention are used as printing paste bases in textile printing. They are preferably used on their own, but they may also be used with other natural or semi-synthetic printing paste bases which are customary in textile printing, such as e.g. sodium alginate, starch, modified starches, guar gum, carob bean meal, gum arabic, dextrin, tragacanth gum, tamarind and/or cellulose ethers, in particular carboxymethylcellulose ethers of known quality or fully synthetic thickening agents such as, e.g., polymeric thickeners. The amount of the sulphoethylcellulose claimed according to the invention should be not less then 10% by weight, since otherwise the advantages according to the invention (stability towards salts, pH; printing quality, etc.) are lost.

Synthetic fibres, natural fibres, mixed fabrics or regenerated cellulose may be used as textile materials.

Dyes which are used are e.g. oxidising, sulphur, developed, wool, chroming, direct, acid, dispersion, naphthol, vat or metal complex dyes, pigments or commercial products comprising a coupling component from developed dyes and a diazoamino compound, but in particular reactive dyes.

The object of the invention is explained in more detail by the following examples (data ms given in parts by weight or % by weight).

EXAMPLE 1

135 parts of a finely milled, bleached, refined Linters cellulose (solids weight: 94.7%) are dispersed in 2,181 parts of isopropanol, 287 parts of a 42.6% strength aqueous solution of sodium vinyl sulphonate and 54.7 parts of water, in a constant temperature reactor fitted with a suitable stirrer and under a nitrogen atmosphere, and stirred for 15 minutes. Then 75.5 parts of sodium hydroxide pellets are added and alkalisation takes place for 80 minutes at 25° to 30° C. The reaction temperature is raised to 75° C. over 30 minutes and maintained at 75° C. for 180 minutes. The mix is neutralised by the addition of an equimolar amount of concentrated acetic acid and the product is filtered off. The sulphoethylcellulose is washed with 70% strength aqueous methanol, dried in air and then milled (screening sequence [mm]: 100% <0.315, 95% <0.25, 40% <0.063). The product has a degree of substitution by sulphoethyl groups of 0.59 and a viscosity of 24 530 mPa.s.

226 g of the milled sulphoethylcellulose obtained in this way (solids content: 87.5%) are then introduced for the next process step in 2,181 parts of isopropanol, 25 parts of NaOH pellets are added and the mixture is dispersed with 285 parts of a 42.7% strength aqueous sodium vinylsulphonate solution and stirred for 15 minutes. After the addition of 25 parts of sodium hydroxide pellets, the mix is alkalised for 30 minutes at 20° to 30° C. and heated to 75° C. over 30 minutes. After 180 minutes, another 154 parts of the 50% strength sodium vinylsulphonate solution are added dropwise and etherification is continued for another 180 minutes at 75° C. Finally, the mix is neutralised by the addition of an equimolar amount of conc. acetic acid and the product is filtered off. After treating with 70% strength methanol, the product is dried in air. The degree of substitution by sulphoethyl groups is 1.52. The viscosity is 4,490 mPa.s.

EXAMPLE 2 (Comparison example CMC1).

127 parts of a finely milled, bleached, refined Linters cellulose were dispersed in 2,193 parts of isopropanol in a constant temperature reactor fitted with a suitable stirrer, under a nitrogen atmosphere. After the addition of 88 parts of sodium hydroxide pellets in 210 parts of water, alkalisation is performed for 80 minutes at 25° to 30° C. 130 parts of an 80% strength aqueous solution of monochloroacetic acid are added. The mix is heated to 70° C. over 30 minutes and held at this temperature for 120 minutes. Another 88 parts of sodium hydroxide pellets are added in the warm and then 130 parts of an 80% strength aqueous monochloroacetic acid are added continuously over the course of 20 minutes. Etherification is continued for a further 120 minutes at 70° C. The product is separated and reaction by-products are removed by washing with 70% strength methanol. The CMC is dried at room temperature and milled. The degree of substitution by carboxymethyl groups is 1.73. The viscosity of the purified product is 19,000 mPa.s.

EXAMPLE 3 (Comparison example CMC2)

50 kg of a commercially obtainable CMC powder (Walocel ® CRT 30000 P [screening sequence (mm): 100% <0.315, 95% <0.25, 40% <0.063][solids content: 92%]are suspended in 465 l of isopropanol and 12.9 l of water in a constant temperature reactor under a nitrogen atmosphere. After the addition of 44.3 kg of a 49.9% strength sodium hydroxide solution, the mix is alkalised for 80 minutes at 30° to 32° C. Then 32 kg of an 80% strength aqueous solution of monochloroacetic acid is added over 10 minutes. The mix is heated to 75° C. over 15 minutes and held at this temperature for 120 minutes. It is then cooled to 30° C. over 45 minutes and separated in a centrifuge. The CMC is washed with 80% strength methanol until it is salt-free and then dried at 70° C. The degree of substitution by carboxymethyl groups is 1.56. The viscosity of the 2% strength solution is 45,300 mPa.s.

The crushing process taking place after the first and optionally after the second step is performed as a dry or wet milling procedure. Types of mill which may be used are roller mills, ball roller mills, beater and disintegrator mills, jet mills or vibratory mills, etc. In order to improve the solubility of the thickening agent during printing of the textile material, it is recommended that the product is milled before use and adjusted on a screening line to 100% ≦2.0 mm.

In the examples which follow, the effect of a sulphoethylcellulose claimed according to the invention is compared as a thickening agent in textile printing with a commercial sodium alginate (Lamitex M 5, Protan, Norway) and with highly substituted carboxymethylcelluloses. Sodium alginate as a 6% strength solution is compared with the above-mentioned products, whose viscosities have been adjusted to a constant viscosity of ca. 30,000 mPa.s [Brookfield RVS, Spindle 4.20 rpm].

The composition of the stock thickeners prepared with the thickening agents is given in Table 1.

The printing paste is obtained by blending specific amounts of each stock thickener (90 parts) with specific amounts of the dye (10 parts) and distilled water. A commercial reactive dye (Cibacron Türkis PG 3 ®[40%]) is used as the dye.

TABLE 1

Composition of the stock thickeners

| Thickening components | Stock thickeners[1] | | | | |
|---|---|---|---|---|---|
| | A | B | C | D | E |
| Lamitex M 5[2] | 550 | — | — | 275 | — |
| SEC | — | 700 | — | — | — |
| CMC (Comparison 1) | — | — | 700 | 350 | — |
| CMC (Comparison 2) | — | — | — | — | 500 |
| Lyoprint AP ®[3] | 3 | 3 | 3 | 3 | 3 |
| Lyoprint RG ®[4] | 10 | 10 | 10 | 10 | 10 |
| Urea | 100 | 100 | 100 | 100 | 100 |
| Na₂CO₃ soln. (1:4) | 75 | 75 | 75 | 75 | 75 |
| Permutit-water | 262 | 112 | 112 | 187 | 312 |
| Total amount | | | 1.000 g | | |

[1] Data in parts by wt.
[2] Lamitex M 5 contains 5 g/kg of sodium hexametaphosphate (Calgon T) and 5 g/kg of formalin (37% strength)
[3] Defoamer: from BASF, Ludwigshafen
[4] Oxidising agent: from BASF, Ludwigshafen Printing tests were performed with the final printing paste using cotton-schussatin (mercerised, bleached) as substrate. The textile is dried for ca. 10 minutes at 102° to 105° C. (saturated steam fixing [Mathis drier]) and then fixed by dry heat (hot air) (1 minute at 200° C., Mathis drier). The washing out process takes place in three stages.

a) thorough, cold rinsing,
b) treatment in the neighbourhood of 100° C. (10 minutes),
c) cold rinsing.

To assess the intensity, penetration, tone, feel and evenness, a 64-T stencil (right angled) and a doctor blade with a diameter of 8 mm were used (magnetic stage 3, speed stage 3) (room temperature, flat film printing). To assess the positional sharpness, a 68-T test stencil and a doctor blade with a diameter of 8 mm were used (magnetic stage 3, speed stage 3). The results of the printing process are given in Table 2.

TABLE 2

Printing results - comparison with Lamitex M 5 (No. 1), saturated steam fixing

| Print or printing paste | Stock thickener | Intensity[1] | Tone[1] | Penetration | Evenness | Feel | Positional sharpness |
|---|---|---|---|---|---|---|---|
| 1 | A | 100%[2] | [2] | [2] | [2] | [2] | [2] |
| 2 | B | 110% | practically the same | a little greater | practically the same | practically the same | slightly/much better |
| 3 | C | practically the same | practically the same | much greater | practically the same | slightly/much poorer | much/greatly better |
| 4 | D | practically the same | practically the same | a bit/slightly greater | practically the same | slightly poorer | slightly/much better |
| 5 | E | 112% | practically the same | much greater | practically the same | much poorer | slightly better |

[1] = colorimetric measurement
[2] = comparison

The technical terms used in the Tables are known to the specialist cellulose or textile printer and require no further explanation. In this connection, reference may be made to the chapters called "Textildruck" and "Textilfärberei" in Ullmans Encyclopädie der Technischen Chemie, vol. 22, page 565 et seq. and page 635 et seq. (Verlag Chemie, Weinheim, 1982).

The values given in the Table clearly demonstrate the superiority of the claimed sulphoethylcellulose when used for textile printing. Apart from stability towards electrolytes and pH, which are known from the literature, (see e.g. U.S. Pat No. 2,811,519, J-63 182-301 A and EP-0 319 865 A2), the product has the following advantages.

TABLE 3

Exemplary comparison between conventional thickeners used in textile printing and the cellulose ether claimed according to the invention

| Parameter | Alginate | SEC | CMC |
|---|---|---|---|
| 1. Preservation (formaldehyde) | Absolutely essential | Not necessary | Not necessary |
| 2. Shear stability | Good | Good | Good |
| 3. Evenness of printing | Good | Good | Good |
| 4. Sharpness of printing | Good | Very good | Very good |
| 5. Feel of printed substrate | Very good | Very good | Poor |
| 6. Penetration of the fabric | Good | Good | Good |
| 7. Tone | Good | Good | Good |
| 8. Reproducibility | Poor | Good | Good |

We claim:

1. In the printing of textile wherein to the textile there is applied a printing paste, containing a thickening agent or rheology improver, the improvement which comprises including in said thickening agent or rheology improver a sulphoalkylcellulose having a degree of substitution by sulphoalkyl groups of 1.2 to 2.

2. A process of printing according to claim 1, wherein the sulphoalkyl cellulose is sulphoethylcellulose having a degree of substitution by sulphoethyl groups of 1.4 to 1.8.

3. A process according to claim 2, wherein the sulphoethylcellulose is produced by reacting a slurry of cellulose with a sulphoethylating agent in a first step, drying, milling and purifying thereafter, and further sulphoethylating.

4. A process according to claim 1, wherein the thickening agent or rheology improver further includes at least one of sodium alginate, starch, modified starches, guar gum, carob bean meal, gum arabic, dextrin, tragacanth gum, tamarind, carboxymethylcellulose and a polyacrylate.

5. A process according to claim 1, wherein the textile material comprises fibers of natural origin, synthetic origin or regenerated cellulose.

6. A process according to claim 1, wherein the printing paste further includes at least one dyestuff selected from the group consisting of oxidizing, sulphur, developed, wool, chroming, direct, acid, dispersion, naphthol, vat, metal complex, reactive, pigment and a mixture of a developer dye and a diazoamino compound.

7. A process according to claim 3, wherein the thickening agent or rheology improver further includes at least one of sodium, tamarind, carboxymethycellulose and polyacrylate; the textile material comprises fibers of natural origin, synthetic origin or regenerated cellulose; and the printing paste contains a reactive dye.

* * * * *

UNITED STATES PATENT AND TRADEMARK OFFICE
CERTIFICATE OF CORRECTION

PATENT NO. : 5,442,054
DATED : August 15, 1995
INVENTOR(S) : Kiesewetter, et al.

It is certified that error appears in the above-indentified patent and that said Letters Patent is hereby corrected as shown below:

Title Page & Col. 1  [54] Title: Delete " HIGHLY SUB-STITUTED SULPHOALKYCELLULOSE DE-RIVATIVES, ESPECIALLY SULPHOETHYCELLU-LOSE ETHER, A PROCESS FOR THEIR PREPARATION AND THEIR USE AS THICKENING AGENT FOR TEXTILE PRINTING PASTES " and substitute -- HIGHLY SUBSTITUTED SULPHOALKYLCELLULOSE DERIVATIVES, ESPECIALLY SULPHOETHYLCELLULOSE ETHER, A PROCESS FOR THEIR PREPARATION AND THEIR USE AS THICKENING AGENTS FOR TEXTILE PRINTING PASTES --

Signed and Sealed this

Sixth Day of August, 1996

Attest:

BRUCE LEHMAN

Attesting Officer    Commissioner of Patents and Trademarks